United States Patent

[11] 3,617,923

[72] Inventors Robert E. Paradysz
Coopersburg;
Warren L. Smith, Allentown, both of Pa.
[21] Appl. No. 874,453
[22] Filed Nov. 6, 1969
[45] Patented Nov. 2, 1971
[73] Assignee Bell Telephone Laboratories, Incorporated
Murray Hill, N.J.

[54] BEAT FREQUENCY GENERATOR USING TWO OSCILLATORS CONTROLLED BY A MULTIRESONATOR CRYSTAL
14 Claims, 8 Drawing Figs.

[52] U.S. Cl. 331/43, 310/9.8, 331/56, 331/116 R, 331/163, 333/72
[51] Int. Cl. H03b 5/36, H03b 21/00
[50] Field of Search 331/37, 40–43, 56, 116 R, 163; 333/72; 310/9.8

[56] References Cited
UNITED STATES PATENTS
2,859,346 11/1958 Firestone et al. 331/37
3,525,944 8/1970 Smith 310/9.8 X

*Primary Examiner*—Roy Lake
*Assistant Examiner*—Siegfried H. Grimm
*Attorneys*—R. J. Guenther and Edwin B. Cave

ABSTRACT: The unique properties of a monolithic crystal filter are turned to account in a low-frequency crystal oscillator system. Each of two different relatively high-frequency signals is generated by a respective crystal controlled oscillator. The oscillators share a common crystal wafer to which each is connected by a respective pair of electrodes. The relatively low beat frequency signal or difference frequency of the oscillators is extracted by a third set of electrodes mounted on the crystal between the electrode pairs connected to the oscillators.

INVENTORS R. E. PARADYSZ
W. L. SMITH
BY
ATTORNEY

BEAT FREQUENCY GENERATOR USING TWO OSCILLATORS CONTROLLED BY A MULTIRESONATOR CRYSTAL

BACKGROUND OF THE INVENTION

1. FIELD OF THE INVENTION

This invention relates to low-frequency signal generators and, more particularly, to a system employing a pair of crystal controlled oscillators and an arrangement for extracting the desired low-frequency signal in the form of the difference or beat frequency of the two oscillators.

2. DESCRIPTION OF THE PRIOR ART

Various approaches have been used in the past in attempts to employ crystal-controlled oscillators in the generation of low-frequency signals. Frequency control by crystals is highly desirable owing to the superior performance that is attained in terms of accuracy, reliability and stability. For relatively low frequency generation, however, particularly for frequencies in the range of several hundred kHz. and lower, direct frequency control by crystals is normally impractical and at best extremely awkward, owing to the excessive crystal size required at low-frequency resonances. This problem has led to the development of systems employing crystal-controlled oscillators for the generation of relatively high frequencies and assorted intermodulation and mixing circuits that derive a lower difference or beat frequency. Illustrative of these systems are the arrangements disclosed by A. McL. Nicholson in U.S. Pat. No. 1,866,267 issued July 5, 1932and by W. L. Firestone and T. L. Leming in U.S. Pat. No. 2,859,346 issued Nov. 4, 1958. Disadvantages of such systems include undue complexity, limited isolation between the oscillators and consequent limitations on frequency accuracy and stability which for some applications are unacceptable. The lack of frequency stability with changes in temperature constitutes another problem.

Accordingly, the broad object of the invention is to eliminate or reduce the effect of the disadvantages noted.

SUMMARY OF THE INVENTION

The stated object and related objects are achieved in accordance with the principles of the invention by a low-frequency signal generating system that employs a single multifunction crystal that operates not only as the frequency control for each of a pair of relatively high frequency oscillators, but also as a for deriving a beat or difference frequency from the fundamental frequencies of the oscillators. The crystal comprises a single piezoelectric wafer sandwiched between first and second pairs of electrodes and a similar third pair of electrodes centered, approximately, between the first two. Each of the first and second pairs of electrodes is connected to a respective oscillator circuit so that the resonator comprising a particular electrode pair and the crystal portion therebetween operates as the frequency control element for its respective oscillator. The desired frequency difference between the two oscillators is achieved primarily by appropriate selection of the electrode mass or loading of each of the two crystal resonators.

In accordance with the invention, the third pair of electrodes is acoustically coupled to but electrically isolated from the first and second electrode pairs to a degree which enables the third set of electrodes to extract the beat or difference frequency form the two frequency resonators.

Among the significant advantages realized in a generator in accordance with the invention is an exceptionally high tolerance to temperature changes insofar as frequency stability is concerned. Since each of the three pairs of electrodes is mounted in similar fashion on a common piezoelectric crystal wafer, there is good correlation among the temperature coefficients of each of the resonators that is made up of an electrode set and that part of the crystal that is sandwiched therebetween.

The principles of the invention rest in part upon the exploitation of certain of the features, modified in some respects, of the monolithic crystal filter described by W. D. Beaver and R. A. Sykes in a copending application Ser. No. 558,338, filed June 17, 1966 and now Pat No. 3,564,463. Although the instant invention is not specifically related to filters per se, it has been discovered that a number of aspects of the filter structure of Beaver and Sykes, may be advantageously turned to account in terms of a frequency-generating circuit in accordance with the invention. Briefly, the Beaver-Sykes filter employs a single crystal wafer sandwiched between first and second sets of electrodes. By controlling the mass of the electrodes and the spacing therebetween in accordance with specifically defined parameters, the Beaver-Sykes filter achieves a smooth, narrow and controllable passband. In the instant invention certain of these parameters are utilized to define not the mass loading of and the spacing between the two end sets of electrodes, but, instead, are used to define these parameters in terms of the relationships between each of the end or input electrode pairs and the center or common output electrode pair. Specifically, the distance between each of the end electrode pairs and the center or output pair and the relative mass loading of these electrode pairs are so adjusted that in each case the image resistance has a real positive continuous portion that starts at substantially zero, changes to a finite maximum value and returns to substantially zero as frequency increases. Further, the image resistance has a second portion that starts at substantially infinite resistance, changes to a nonzero minimum value greater than the maximum value and returns to a substantially infinite resistance as frequency increases, the second portion being higher in frequency than the first portion.

Another parameter of interest that is used to define a crystal structure in accordance with the invention may be expressed in terms of the characteristics of a lattice equivalent circuit with line impedance and diagonal impedance having resonant and antiresonant frequencies. For purposes of definition, the crystal structure in accordance with the invention may be considered as two structures, each sharing or having in common the center electrode pair. Additionally, for each structure, the body portion of the crystal not bonded by electrodes may be termed a "first region." A "second region" may be defined as that portion of the crystal between one pair of electrodes together with that electrode pair, and a "third region" may be defined as that portion of the crystal body between the second (or center) pair of electrodes together with those electrodes. The first region surrounds both of the other regions and separates them from each other in each of the defined structures.

In accordance with the invention, the mass loading of electrodes and the spacing between adjacent electrode pairs is so adjusted that the second and third regions, or resonators defined above, exhibit resonant frequencies, in terms of the lattice equivalent circuit, which are sufficiently different from the resonant frequencies of the first region so that the antiresonant frequencies of the line and diagonal impedances are higher than the highest resonant frequency of the line and diagonal impedances.

In accordance with another feature of the invention, the center or output resonator is tuned to the geometric mean of the two input resonator frequencies.

Still another feature of the invention requires the coefficient of coupling between each of the input resonators and the output resonator to be less than half of the inverse capacitance ratios of the resonators.

In contrast to the Beaver-Sykes filter, in the crystal structure of the instant invention the coefficient of coupling between the outside resonators is kept negligibly small in order to ensure virtually complete isolation between the oscillator circuits.

BRIEF DESCRIPTION OF THE DRAWING

FOG. 1 is a sketch shown in perspective of the crystal and electrode structure employed in accordance with the invention.

DETAILED DESCRIPTION

Figure 1:
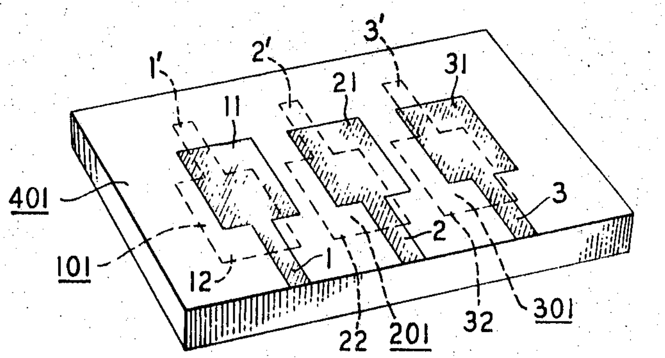

The crystal structure or multiple resonator of FIG. 1 is a three-port piezoelectric device consisting of three trapped energy resonators 101, 201, and 301 fabricated on a single AT-cut quartz wafer 401. Each of the resonators 101, 201 and 301 is formed from a corresponding electrode pair 11–12, 21–22 and 31–32, together with that portion of the crystal wafer 401 that in each case is sandwiched therebetween.

Figure 5:
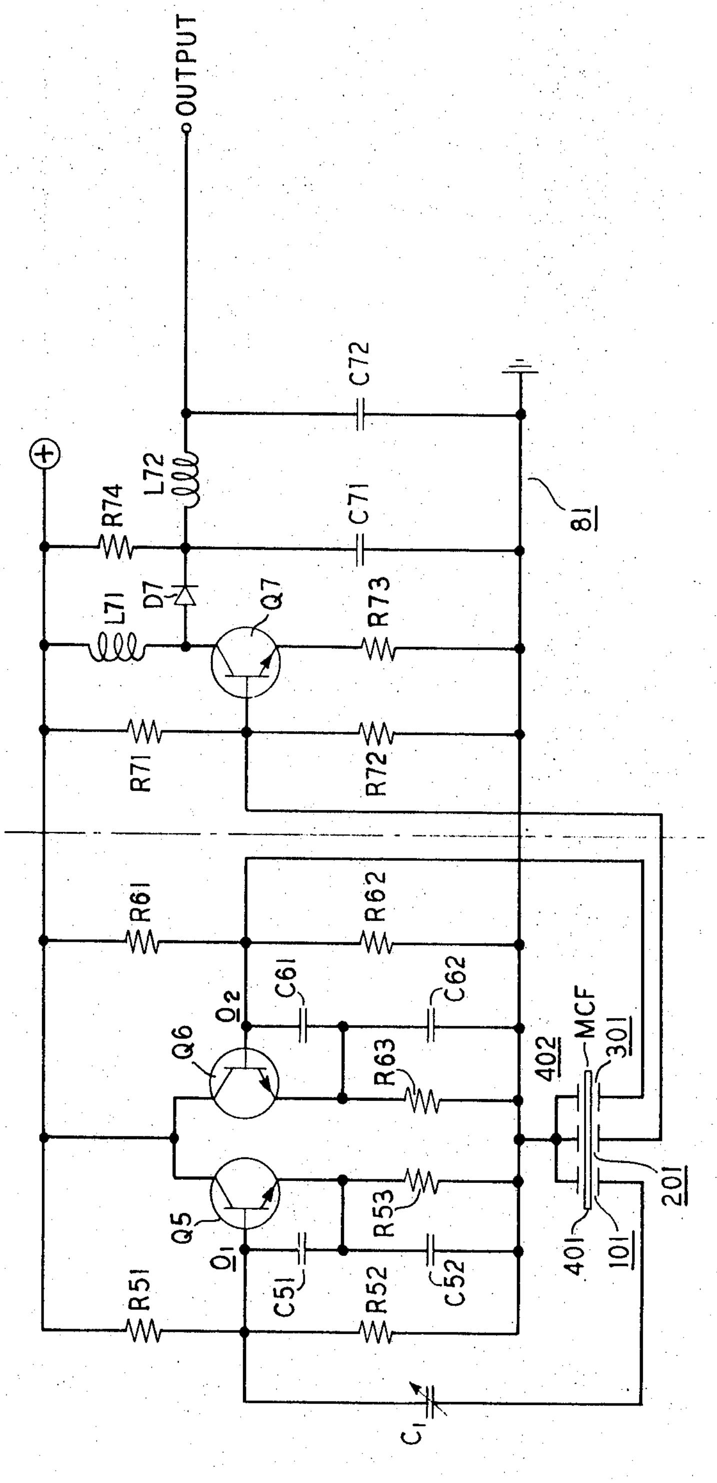
FIG. 5 is a schematic circuit diagram of a frequency generator in accordance with the invention employing the crystal structure shown in FIG. 1.

The three-element monolithic quartz resonator of FIG. 1 is shown in FIG. 5 utilized in accordance with the invention as the key element is a signal frequency generator. The signal frequency generator also employs a pair of oscillators $0_1$ and $0_2$ and a difference frequency detector 81. Oscillator $O_1$ includes a transistor Q5 as its active element together with resistors R51, R52 and R53 and capacitors C51 and C52. The frequency of oscillator $O_1$ is controlled by the crystal resonator 101. A second oscillator $O_2$ includes a transistor Q6 together with resistors R61, R62 and R63 and capacitors C61 and C62. The frequency of the oscillator $O_2$ is established by the resonator 301.

The dual configuration for transistors Q5 and Q6 is advantageous for the oscillators $o_1$ and $O_2$ since it facilitates integration on a single silicon chip, thus ensuring matched characteristics and good thermal tracking. Each oscillator is connected in grounded collector relation with base-to-emitter feedback. This arrangement is preferred inasmuch as it permits a common connection to the monolithic resonator.

In accordance with the invention, the coupling coefficient-linking resonators 101 and 201 is made equal to the coupling coefficient-linking resonators 301 and 201. Electrode spacing and loading is adjusted in accordance with the invention to enable the resonator 201 to serve as an output for the beat or difference frequency of the oscillators $O_1$ and $O_2$. This output is applied to the base of transistor Q7 and is thereby amplified before detection by the diode D7. Filtering is accomplished by the inductors L71 and L72 and by the capacitors C71 and C72 before the signal is applied to the output point. Resistors R71, R72, R73 and R74 control biasing levels.

In accordance with the invention, a variable capacitor C1 is used to adjust the frequency finally applied to the output point. In this manner, a wide range of frequency adjustment is provided and a substantially greater percentage of frequency change is made possible than would be the case with a conventional oscillator circuit employing a low-frequency crystal.

The principles of the invention require the establishment of a high-Q-resonant impedance at each of the two oscillator-control ports 1–1′ and 3—3′ as shown in FIG. 1. Additionally, both oscillator signals must be transferred to the output port 2–2′ in order to obtain a difference frequency and further, a substantial degree of isolation must be established between the two oscillator-control ports 1–1′ and 3–3′.

Figure 2:
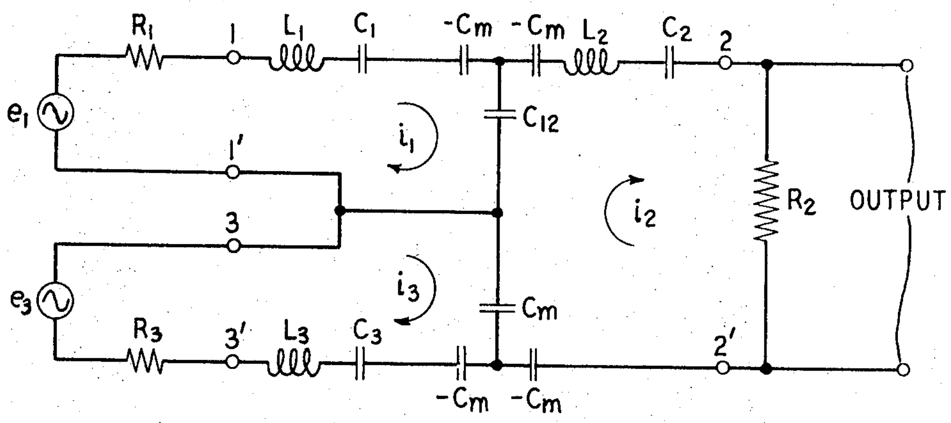
FIG. 2 is an equivalent network of the device shown in FIG. 1.

The means by which equivalent-circuit parameters are selected in accordance with the invention to meet the requirements noted may best be explained in terms of the characteristics of the device equivalent circuit shown in FIG. 2. Inspection of this network shows that it is symmetrical with respect to the two oscillator signals provided that the coupling coefficients $K_{12}$ and $K_{23}$ are made equal and provided further that resonator 201 is tuned to the geometric mean of the two other resonator frequencies. For the narrowband case, this implies that $$\omega_2=\sqrt{\omega_1\omega_3}\approx\omega_1+\frac{1}{2}(\omega_3-\omega_1). \qquad (1)$$

Placing the foregoing restrictions on the design, one may solve for the performance of the network with a single excitation and assume that the amplitudes of the other excitation signal will be the same, which is to say that the response of the resonators 201 and 301 to the oscillating signal current in the resonator 101 will be the same as the response of the resonators 201 and 101, respectively, to the oscillating signal current in the resonator 301. The mesh equation for this network with excitation applied to mesh I may be expressed as follows:

$$e_1=\left[R_1+j\left(\omega L_1-\frac{1}{\omega C_1}\right)\right]i_1+\left(j\frac{1}{\omega C_m}\right)i_2$$

$$O=\left(j\frac{1}{\omega C_m}\right)i_1+\left[R_2+j\left(\omega L_2-\frac{1}{\omega C_2}\right)\right]i_2+\left(j\frac{1}{\omega C_m}\right)i_3$$

$$O=\left(j\frac{1}{\omega C_m}\right)i_2+\left[R_3+j\left(\omega L_3-\frac{1}{\omega C_3}\right)\right]i_3. \qquad (2)$$

Normalizing for impedance, a normalized frequency variable $F$ and a signal dissipation constant $D$ may be defined as follows:

$$F_1=\frac{\omega}{\omega_1}-\frac{\omega_1}{\omega};F_2=\frac{\omega}{\omega_2}-\frac{\omega_2}{\omega};F_3=\frac{\omega}{\omega_3}-\frac{\omega_3}{\omega}, \qquad (3)$$

and $$D_1=\frac{R_1}{\omega_1L_1};D_2=\frac{R_2}{\omega_2L_2};D_3=\frac{R_3}{\omega_3L_3}. \qquad (4)$$

The coefficient of coupling $K$ between the meshes may be written as $$K=\frac{\sqrt{C_1C_2}}{C_m}=\frac{\sqrt{C_2C_3}}{C_m} \qquad (5)$$

where $C_m$ is as shown in FIG. 2.

To further generalize the foregoing analysis, the expressions of equation 2 may be further normalized by defining a new frequency variable $\alpha$. As indicated above, the resonators 101 and 301 are tuned in the vicinity of the two desired oscillator frequencies and the resonator 201 is tuned at the midfrequency of these two. Thus, let $$\omega_1=\omega_2(1-\Delta)$$
$$\omega_3=\omega_2(1+\Delta),$$

where $\Delta$ is an incremental frequency variable. The fractional-frequency spacing $$\frac{\omega_3-\omega_1}{\omega_2}=2\Delta$$

may be considered as a pseudobandwidth for the system. Thus, the fractional-frequency deviation from midband, ($\omega_2$), may be "normalized" by defining the arbitrary frequency variable $\alpha$ as follows:

$$\alpha=\left(\frac{\omega-\omega_2}{\omega_2}\right)=/\Delta\cdot \qquad (7)$$

By substitution, it is evident that, $$F_1/2=\alpha+1;\ F_2/2\Delta=\alpha;\ F_3/2\Delta=\alpha-1. \qquad (8)$$

Also, the coupling coefficients and dissipation constants may be normalized in terms of the bandwidth as $$D_1/2\Delta=d_1;\ D_2/2\Delta=d_2;\ D_3/\ 2\Delta=d_3 \qquad (9)$$

and $k=K/2\Delta$. (10) Consequently, the mesh Equations 2, normalized for impedance and bandwidth, may be written as follows:

$$\epsilon_1 = [d_1 + j(\alpha+1)]i_1 + jk\, i_2$$
$$0 = jk\, i_1 + [d_2 + j\alpha]i_2 + jk\, i_3$$
$$0 = jk\, i_2 + [d_3 + j(\alpha-1)]i_3\,, \quad (11)$$

where $\epsilon_1$ is the normalized excitation voltage.

In this analysis, the determination of the phase slope of the input impedance of the terminals 1–1′ in the vicinity of zero phase is of interest, since it is at this frequency that the oscillator will operate. Frequency stability therefore necessarily depends on this phase slope and therefore on the coupling coefficients and loading of the other terminal pairs. A straightforward network calculation gives the result $Z_{11} = D/D_{11}$. The other properties of the network which are of interest in this connection are the mesh current ratios $i_2/i_1$ or $i_3/i_1$. The first ratio is a direct measure of the available output signal, and the second ratio is a measure of the isolation obtained between the two oscillator loops. The individual mesh currents may then be calculated as follows:

$$i_1 = \frac{\epsilon_1 D_{11}}{D}$$
$$i_2 = \frac{\epsilon_1 D_{12}}{D}$$
$$i_3 = \frac{\epsilon_1 D_{13}}{D} \quad (12)$$

Hence, the current magnitude ratios of interest are directly $$i_2/i_1 = D_{12}/D_{11};\ i_3/i_1 = D_{13}/D_{11}\,.$$

$D$, $D_{11}$, $D_{12}$ and $D_{13}$ as used above are the usual determinants of the mesh equation coefficients, i.e., $$D = \begin{vmatrix} [d_1 + j(\alpha+1)] & jk & 0 \\ jk & [d_2 + j\alpha] & jk \\ 0 & jk & [d_3 + j(\alpha-1)] \end{vmatrix}$$

$$D_{11} = \begin{vmatrix} [d_2 + j\alpha] & jk \\ jk & [d_3 + j(\alpha-1)] \end{vmatrix}$$

$$D_{12} = \begin{vmatrix} jk & jk \\ 0 & [d_3 + j(\alpha-1)] \end{vmatrix}$$

$$D_{13} = \begin{vmatrix} jk & [d_2 + j\alpha] \\ 0 & jk \end{vmatrix} \quad (14)$$

For one illustrative embodiment of the invention, numerical calculations for the terminal impedance $Z_{11}$ and for mesh currents were carried out for values of k measuring from .05 to 0.030, and values of $d_2$ from 1.0 to 2.0. Since good frequency stability is required for the oscillating circuit, it is apparent that the dissipation factors $d_1$ and $d_3$ should be kept as low as practicable. For the purposes of calculation, this value was chosen as 0.05 although in practice, it is obviously determined primarily by the internal dissipation of the resonator.

Figure 3:
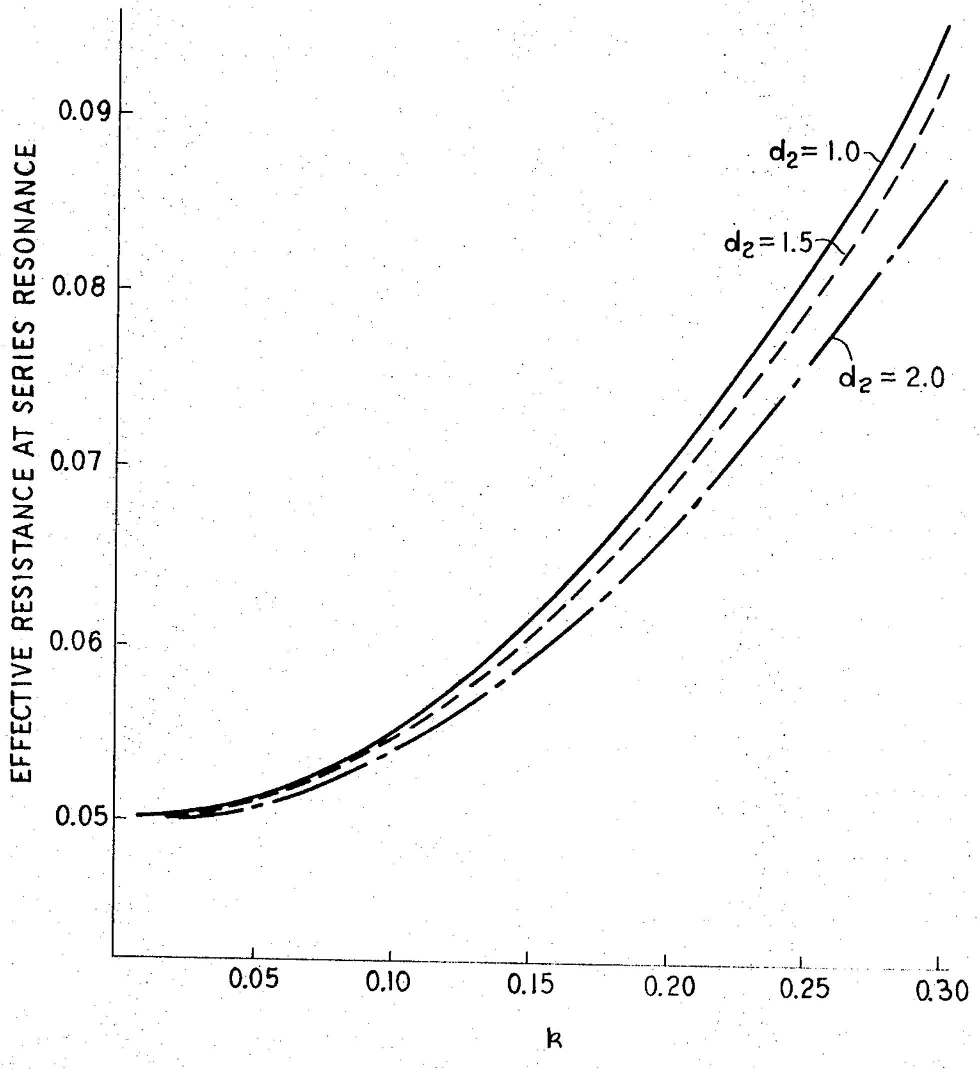
FIG. 3 is a plot of the effective resistance at series resonance versus the coefficient of coupling for a structure in accordance with the invention.

Curves of effective series resistance of the terminal impedance versus the coefficient of coupling as shown in FIG. 3, indicate the general dependence of the circuit on the coupling and load impedance. Additional analysis shows that the apparent Q and the corresponding phase-slope of the frequency-controlling resonance are reduced rapidly as the coupling coefficient increases. From this analysis, it appears that a normalized coupling coefficient of about 0.10 is a suitable compromise, in one embodiment of the invention, between output level and resonance Q degradation. Under the conditions indicated ($d_1 = d_3 = 0.050$, $k = 0.10$) and choosing $d_2 = 1.5$, it appears that the level between oscillators is acceptable inasmuch as the current induced in mesh III due to oscillator I is about 50 db below that due to oscillator III. The current in mesh II at each frequency is about 0.05 times the current in the oscillator controlling the resonator, but owing to the high value of load resistance, approximately 30 times the effective resistance of the controlling resonator, the terminal voltage is of the same order of magnitude as the oscillator terminal voltage which is an acceptable relation.

Figure 4:
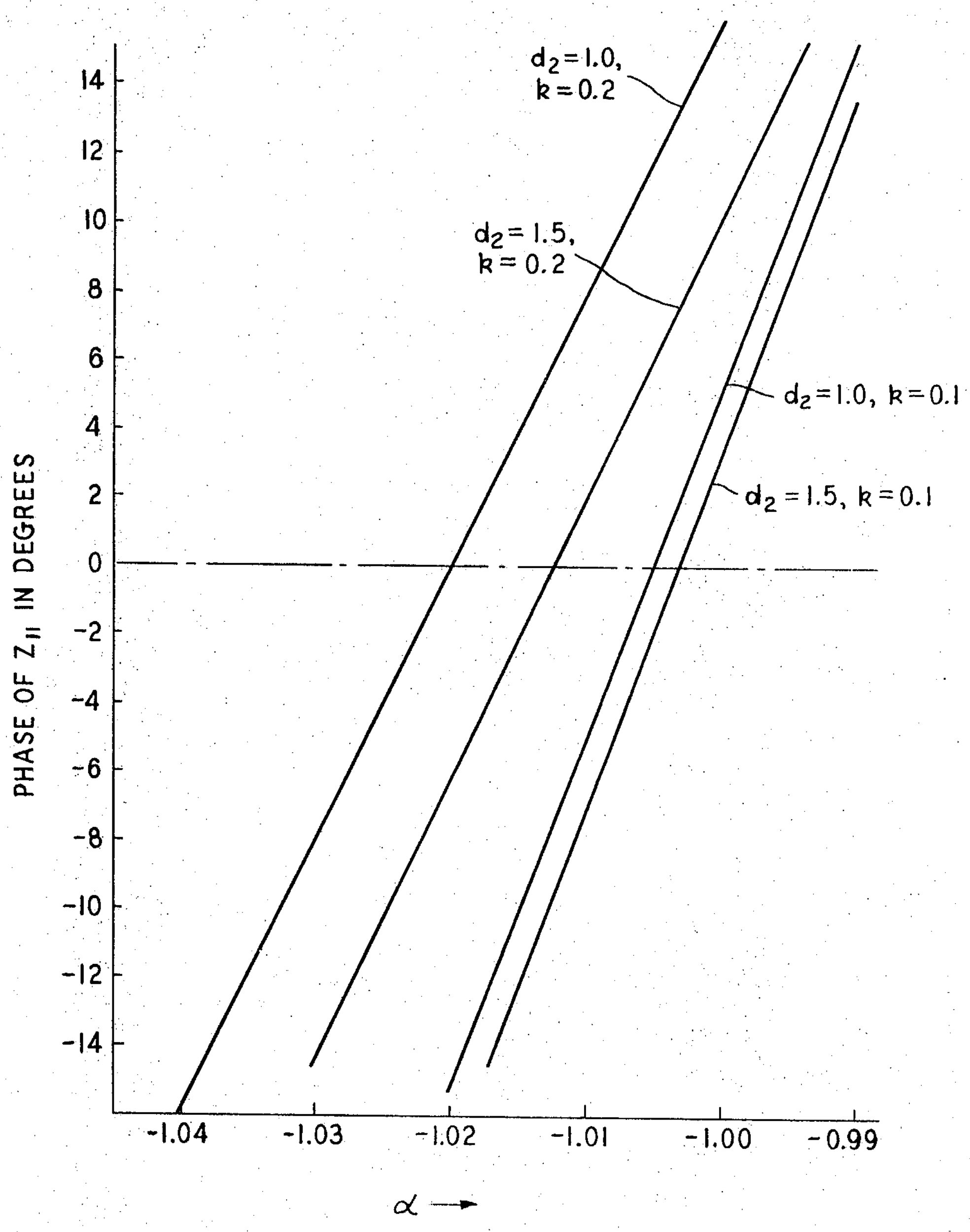
FIG. 4 is a plot of the terminal impedance versus an arbitrary frequency variable for a structure in accordance with the invention.

The effects on operating frequency produced by changes in load resistance in the embodiment of the invention discussed above can be seen from the curves of FIG. 4 in which the phase angle of the terminal impedance is plotted for two values of coupling coefficient and for two values of resonator-II loading. Assuming a stable, zero-phase oscillator circuit, it is evident that an increase of about 50 percent in loading causes a frequency shift of about 0.002 bandwidths with a coupling of 0.1, while the same change produces a shift in frequency of 0.0075 bandwidths if a coefficient of 0.2 is employed.

Figure 6:
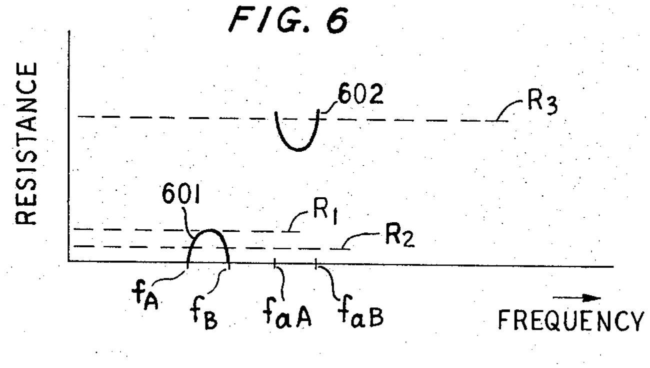
FIG. 6 is a plot of the image impedance characteristics of a device in accordance with the invention.

As indicated above under the heading, Summary of the Invention, the results achieved by a generator in accordance with the invention are enhanced in terms of efficiency, frequency stability and reliability when certain features of the Beaver-Sykes monolithic crystal filter are incorporated in the unitary, multiresonator crystal structure. One such feature may be defined in terms of image resistance. Specifically, the difference between the resonant frequencies of each of the three resonators should be sufficiently different from the characteristic frequency of the unloaded or unelectroded portion of the crystal wafer, and the end resonators must be spaced sufficiently distant from the center resonator so that image resistance of each of the structures comprising an end resonator and the center resonator has, as shown in FIG. 6, a real positive continuous portion 601 between frequencies $f_A$ and $f_B$ that starts at substantially zero, changes to a finite maximum value at resistance $R_1$ and returns to substantially zero as frequency increases. This image resistance has a second portion 602 between frequencies $f_{\alpha A}$ and $f_{\alpha B}$ that starts at substantially infinite resistance, changes to a nonzero minimum value greater than the maximum value and returns to a substantially infinite resistance as frequency increases, the second portion of image resistance 602 being higher in frequency than the first portion 601.

Figure 7:
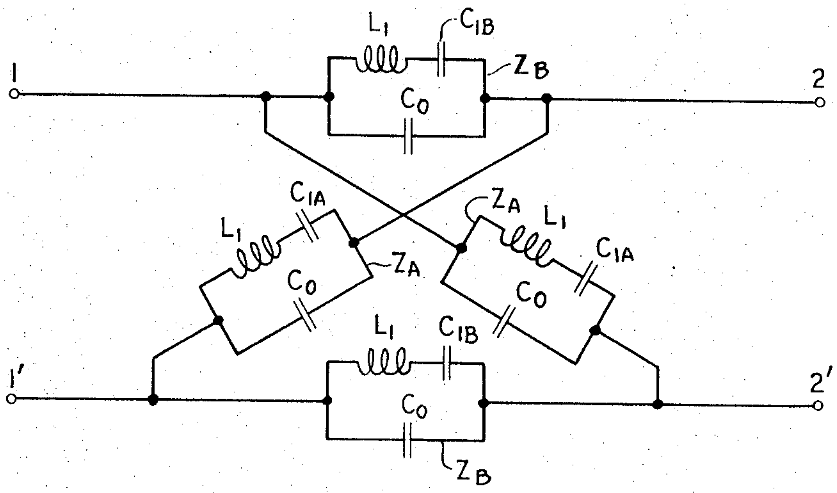
FIG. 7 is a schematic circuit diagram of a lattice network equivalent circuit of a device in accordance with the invention.
Figure 8:
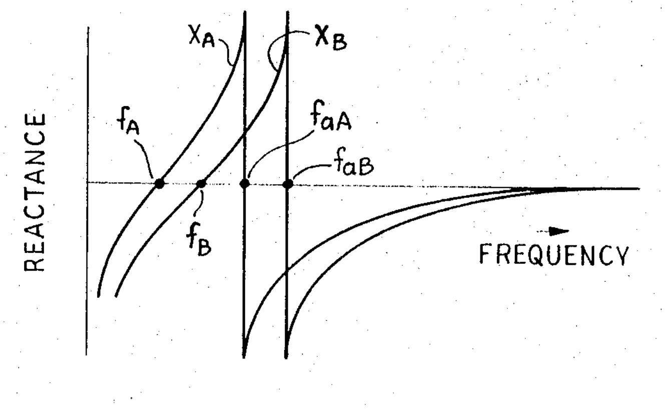
FIG. 8 is a plot of the reactance characteristics of a device in accordance with the invention.

The sufficiency of the difference in resonant frequencies between the resonators of the crystal device and the resonant frequency of the unloaded or unelectroded portion of the crystal may further be defined in terms of the resonant and antiresonant frequencies of the line and diagonal impedances of the lattice impedance network shown in FIG. 7 which is equivalent to either portion of the crystal structure which includes one of the end resonators and the center resonator and the associated portion of the crystal wafer. Specifically, as shown in FIG. 8, in the lattice equivalent circuit of FIG. 7, which includes a line impedance $Z_B$ (reactance $X_B$) and a diagonal impedance $Z_A$ (reactance $X_A$) having resonant and antiresonant frequencies, the antiresonant frequencies $f_{\alpha B}$ and $f_{\alpha A}$ of the line and diagonal impedances, respectively, are higher than the highest resonant frequency $f_B$ and $f_A$ of the line and diagonal impedances, respectively, provided that the resonant frequencies of the resonators differ sufficiently from the resonant frequency of the nonloaded or unelectroded portions of the crystal wafer and provided further that the end resonators are spaced sufficiently from the center resonator. In accordance with the invention, the exact degree of the sufficiency of the frequency and spacing differences indicated are those differences which bring about the image impedance relations and the equivalent lattice network resonant and antiresonant frequency relations indicated. The physical degree of difference in each case will, of course, be determined by other diverse parameters such as the frequency ranges involved, the quality, type and dimensions of the crystal wafer and the configuration, area and mass of the electrodes. Irrespective of these parameters, however, many of which are interrelated, the general criteria stated above for determining, in accordance with the invention, the sufficiency of electrode spacing and frequency differences are valid.

It is to be understood tat the embodiment described herein is merely illustrative of the principles of the invention. Various modifications thereto may be effected by persons skilled in the art without departing from the spirit and scope of the invention.

What is claimed is:

1. A signal frequency generator comprising, in combination, unitary, multiresonator crystal means including two end resonators and a center resonator employing a common crystal wafer, each of said resonators comprising a respective pair of electrodes and a respective portion of said wafer sandwiched therebetween, said end resonators being tuned to different first and second frequencies, respectively, and said center resonator being tuned to a frequency between said first and second frequencies, first oscillator means including one of said end resonators for generating a signal at said first frequency, second oscillator means including the other of said end resonators for generating signal at said second frequency, and means including said center resonator for applying the beat frequency of said first and second frequencies to an output point.

2. Apparatus in accordance with claim 1 wherein said frequency to which said center resonator is tuned is the geometric means of said first and second frequencies.

3. Apparatus in accordance with claim 1 wherein said applying means includes a detector circuit and a filter circuit.

4. Apparatus in accordance with claim 1 wherein the coefficient of coupling between said end resonators is less than half the inverse capacitance ratios of said end resonators.

5. Apparatus in accordance with claim 1 wherein the lattice equivalent circuit corresponding to that portion of said multiresonator crystal means comprising one of said end resonators and said center resonator or corresponding to that portion of said multiresonator crystal means comprising the other one of said end resonators and said center resonator, respectively, includes a line impedance and a diagonal impedance, said line impedance and said diagonal impedance having resonant and antiresonant frequencies, said end resonators and said centers resonator exhibiting resonant frequencies sufficiently different from the resonant frequency of the unloaded portion of said crystal wafer and said end resonators being sufficiently distant from said center resonator that said antiresonant frequencies of said line and diagonal impedances are higher than the highest resonant frequency of said line and diagonal impedances.

6. Apparatus for generating an oscillatory signal comprising, in combination, unitary, multiresonator crystal means including two end resonators and a center resonator employing a common crystal wafer, each of said resonators employing a common crystal wafer, each of said resonators comprising a respective unique pair of electrodes and a respective portion of said wafer sandwiches therebetween, said end resonators being tuned to first and second different frequencies, respectively, and said center resonator being tuned to a frequency between said first and second frequencies, first frequency-generating means controlled by said first resonator, second frequency-generating means controlled by said second resonator, and means for extracting the beat frequency of said first two frequencies from said center resonator.

7. Apparatus in accordance with claim 6 wherein the resonant frequencies of said resonators are sufficiently different from the characteristic frequency of those portions of said wafer which are free from said electrodes and wherein the distance between said end resonators and said center resonator is sufficient so that the image resistance of ether portion of said multiresonator crystal structure comprising either one of said end resonators, said center resonator and the corresponding portion of said crystal wafer has a real, positive, continuous first portion that starts at substantially zero, changes to a finite maximum value and returns to substantially zero as frequency increases, and said image resistance has a second portion that starts at substantially infinite resistance, changes to a nonzero minimum value greater than said maximum value and returns to a substantially infinite resistance as frequency increases, said second portion being higher in frequency than said first portion.

8. Apparatus in accordance with claim 7 wherein each of said first and second frequency-generating means comprises a respective transistor driven oscillator circuit, one of said oscillator circuits including a variable capacitance element for varying the output frequency extracted from said center resonator.

9. Unitary, multiresonator crystal means for controlling the input frequencies and the output beat frequency of a difference frequency generator comprising, in combination, two end resonators and a center resonator each including a respective unique pair of electrodes and a common crystal wafer sandwiched therebetween, means including one of said end resonators for establishing a first input frequency, means including the other of said end resonators for establishing a second input frequency, and means including said center resonator for extracting an output signal from which the beat frequency of said input frequencies may be derived.

10. Apparatus in accordance with claim 9 wherein the lattice equivalent circuit corresponding to either portion of said multiresonator crystal means comprising one of said end resonators and said center resonator and the associated portion of said wafer, includes a line impedance and a diagonal impedance, said line impedance and said diagonal impedance having resonant and antiresonant frequencies, said antiresonant frequencies of said line and diagonal impedances exceeding the highest resonant frequency of said line and diagonal impedances.

11. Apparatus in accordance with claim 9 wherein the image resistance of that portion of said multiresonator crystal structure comprising either one of said end resonators, said center resonator and that portion of said crystal wafer common to both, has a real positive continuous portion that starts at substantially zero, changes to a finite maximum value and returns to substantially zero as frequency increases, said image resistance having a second portion that starts at substantially infinite resistance, changes to a nonzero minimum value greater than said maximum value and returns to a substantially infinite resistance as frequency increases, said second portion being higher in frequency than said first portion.

12. Apparatus in accordance with claim 9 wherein said frequency to which said center resonator is tuned is the geometric means of said first and second frequencies.

13. Apparatus in accordance with claim 9 wherein the coefficient of coupling between said end resonators is less than half the inverse capacitance ratios of said end resonators.

14. Apparatus in accordance with claim 9 wherein the coupling between said end resonators is negligible.

* * * * *

UNITED STATES PATENT OFFICE
CERTIFICATE OF CORRECTION

Patent No. 3,617,923 Dated November 2, 1971

Inventor(s) Robert E. Paradysz and Warren L. Smith

It is certified that error appears in the above-identified patent and that said Letters Patent are hereby corrected as shown below:

Column 1, line 28, change "Nicholson" to --Nicolson--;

line 46, after "trol" insert --device--;

line 47, after "a" first occurrence and before "for" insert --means--;

line 64, change "form" to --from--.

Column 2, line 73, change "FOG." to --FIG.--.

Column 3, line 31, change "is" to --in--.

Column 4, line 54, change "Δis" to --Δ is--;

line 64, equation (7), change the end portion from "=/Δ" to --/Δ--;

line 68, equation (8), change the first portion from "$F_1$/2" to --$F_1$/2Δ--.

Column 5, line 28, equation should be numbered --(13)--.

Column 6, line 73, change "tat" to --that--.

Column 7, line 15, (Claim 1) after "generating" and before "signal" insert --a--;

Continued

USCOMM-DC 60376-P69
U.S. GOVERNMENT PRINTING OFFICE : 1969 O—366-334

UNITED STATES PATENT OFFICE
CERTIFICATE OF CORRECTION

Patent No. 3,617,923 Dated November 2, 1971

Inventor(s) Robert E. Paradysz and Warren L. Smith

It is certified that error appears in the above-identified patent and that said Letters Patent are hereby corrected as shown below:

Continued -- line 47, (Claim 6) after "resonators" delete the last two words "employing a";

line 48, (Claim 6) before "comprising" delete "common crystal wafer, each of said resonators";

line 50, (Claim 6) change "sandwiches" to --sandwiched--.

Column 8, line 55, (Claim 12) change "means" to --mean--.

Signed and sealed this 30th day of May 1972.

(SEAL)
Attest:

EDWARD M.FLETCHER,JR.
Attesting Officer

ROBERT GOTTSCHALK
Commissioner of Patents

IRM PO-1050 (10-69)

USCOMM-DC 60376-P69
☆ U.S. GOVERNMENT PRINTING OFFICE : 1969 O—366-334